United States Patent
Nemoto et al.

(10) Patent No.: US 7,489,770 B2
(45) Date of Patent: Feb. 10, 2009

(54) RECEIVING DEVICE, METHOD FOR INCOMING CALL NOTIFICATION, AND PROGRAM

(75) Inventors: Hiroyuki Nemoto, Nishitokyo (JP); Shinichi Kashimoto, Oume (JP); Michiaki Eri, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 183 days.

(21) Appl. No.: 10/586,655

(22) PCT Filed: Dec. 21, 2004

(86) PCT No.: PCT/JP2004/019104

§ 371 (c)(1),
(2), (4) Date: Jul. 19, 2006

(87) PCT Pub. No.: WO2005/069583

PCT Pub. Date: Jul. 28, 2005

(65) Prior Publication Data

US 2007/0165809 A1    Jul. 19, 2007

(30) Foreign Application Priority Data

Jan. 19, 2004    (JP) ............................. 2004-010572

(51) Int. Cl.
*H04M 1/56* (2006.01)
*H04M 15/06* (2006.01)
*H04M 3/00* (2006.01)

(52) U.S. Cl. ........................... 379/142.07; 379/142.01; 379/142.15; 379/373.05; 379/375.01

(58) Field of Classification Search ............ 379/142.01, 379/142.04, 142.06, 142.07, 142.15, 207.02, 379/207.15, 207.16, 373.01–376.02, 88.19, 379/88.2, 88.21, 93.23, 102.03
See application file for complete search history.

(56) References Cited

U.S. PATENT DOCUMENTS

| 6,141,058 | A  | * | 10/2000 | Lagoni et al. ............... 348/563 |
| 6,154,531 | A  | * | 11/2000 | Clapper .................. 379/142.14 |
| 6,845,151 | B2 | * | 1/2005  | Peng .................... 379/142.06 |
| 2002/0009184 | A1 | * | 1/2002 | Shnier ................... 379/142.01 |
| 2003/0108189 | A1 | * | 6/2003 | Barzani ................. 379/373.02 |

FOREIGN PATENT DOCUMENTS

| JP | 62-038648   | 2/1987  |
| JP | 11-331369   | 11/1999 |
| JP | 2001-345889 | 12/2001 |
| JP | 2003-169107 | 6/2003  |

* cited by examiner

*Primary Examiner*—Quoc D Tran
(74) *Attorney, Agent, or Firm*—Pillsbury Winthrop Shaw Pittman, LLP

(57) ABSTRACT

An incoming call notification is performed based on a caller number extracted from a call-in signal and a user status stored in a user status storage unit, and thereby, the incoming call is notified adequately in accordance with the user status and a caller. For example, the contents of the incoming call notification is changed in accordance with a busyness of a user or an importance of the caller, and thereby, a flexible response by the user becomes possible.

7 Claims, 6 Drawing Sheets

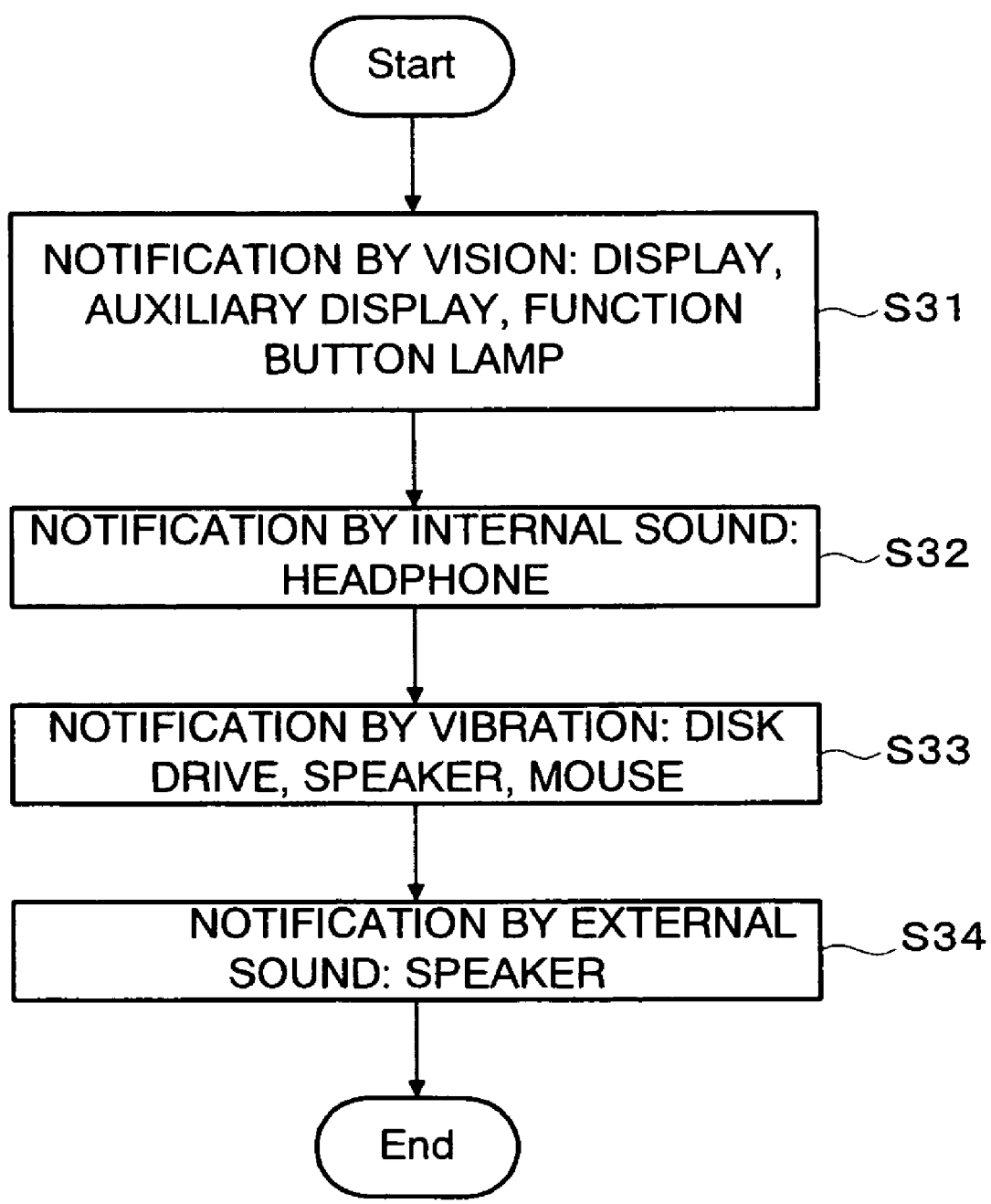

RECEIVING DEVICE, METHOD FOR INCOMING CALL NOTIFICATION, AND PROGRAM

This is the U.S. National Stage of International Application No. PCT/JP2004/019104, filed on Dec. 21, 2004, which, in turn, relies for priority upon Japanese Patent Application No. 2004-010572, filed Jan. 19, 2004, the contents of both of which are incorporated herein by reference in their entireties.

TECHNICAL FIELD

The present invention relates to a receiving device, a method for incoming call notification, and a program for calling by a communication using a packet.

BACKGROUND

An IP phone terminal for calling by a communication using a packet is used.

When an incoming call from others is received by the IP phone terminal, a ring tone sounds and a user's attention is invited. This ring tone sounds from a built-in speaker. However, when the user is using a headset, it is usually the case that the ring tone sounds from the headset.

Incidentally, a technique to output the ring tone from both the headset and the speaker is disclosed (refer to Patent Document 1).

[Patent Document 1] JP-A 2003-169107 (KOKAI)

DISCLOSURE OF THE INVENTION

An incoming call notification to a user is preferable to be adequate. For example, it is convenient for the user if the incoming call is notified in accordance with the user status and a caller of the incoming call.

In consideration of the above, an object of the present invention is to provide a receiving device, a method for an incoming call notification, and a program capable for notifying an incoming call adequately.

A. A receiving device according to the present invention including: a user status storage unit to store a user status; a call-in signal receiving unit to receive a call-in signal including a caller identification indicator to identify a caller; a caller identification indicator extracting unit to extract the caller identification indicator from the call-in signal received by the call-in signal receiving unit; and an incoming call notification unit to perform an incoming call notification based on the user status stored in the user status storage unit and the caller identification indicator extracted by the caller identification indicator extracting unit.

The incoming call notification is performed based on the caller identification indicator extracted from the call-in signal and the user status stored in the user status storage unit, and thereby, the incoming call notification corresponding to the user status and the caller can be performed. For example, the incoming call notification is changed in accordance with the busyness of the user or the importance of the caller, and thereby, the flexible response by the user becomes possible.

(1) Here, the incoming call notification unit may change over an incoming call notification pattern based on the caller identification indicator. For example, it becomes possible to change the incoming call notification pattern in accordance with the importance of the caller.

(2) Further, the incoming call notification unit may have plural incoming call notification means changeable in time-series. For example, the incoming call is notified by using a light, images, or vibrations during initial phase of the incoming call, and thereby, an influence to surroundings can be reduced.

B. A receiving device according to the present invention including: a call-in signal receiving unit to receive a call-in signal; an audio output unit to output a ring tone based on a ring tone signal; an audio output terminal to output the ring tone signal; and a ring tone signal generation unit which generates the ring tone signal based on the call-in signal received by the call-in signal receiving unit, and outputs the ring tone signal to both the audio output terminal and the audio output unit, when an audio output device is connected to the audio output terminal.

When the audio output device is connected to the audio output terminal, the ring tone signal is outputted to both the audio output terminal and the audio output unit. Consequently, even when the user cannot hear the sounds from the audio output device connected to the audio output terminal (for example, the case when the user does not wear a headphone), the user can confirm the ring tone. Besides, the ring tone is generated by the ring tone signal generated by the ring tone signal generation unit, and therefore, the ring tone can be changed appropriately.

(1) The receiving device, may further including: an audio signal output unit which outputs an audio signal to the audio output terminal, and does not output to the audio output unit, when the external audio output device is connected to the audio output terminal.

When the user is listening to a music, for example, by using the headphone as the audio output device, it is possible to prevent this music from being outputted to the audio output unit, for example, to a speaker.

(2) The receiving device, may further including: a call-in notification unit to notify the call-in by using images or vibrations based on the call-in signal received by the call-in signal receiving unit.

The incoming call notification is performed by using a means other than the sound, and thereby, the influence for surroundings can be reduced.

(3) The receiving device, may further including: a disk drive; and a number of rotations control unit to reduce the number of rotations of a disk of the disk drive at the time of a call.

A driving noise of the disk drive is reduced during the call, and thereby, it is possible to prevent the noise from being an obstruction of the call.

BRIEF DESCRIPTION OF THE DRAWINGS

FIG. 5 is a flow chart showing an example of a procedure to change over incoming call notification means in accordance with an elapsed time from a receiving of the incoming call.

FIG. 6A is a view representing an example of a signal path of a ring tone at the time of a call-in.

FIG. 6B is a view representing an example of a signal path of a ring tone at the time of a call-in.

BEST MODE FOR IMPLEMENTING THE INVENTION

Hereinafter, an embodiment of the present invention will be described in detail with reference to the drawings.

Figure 1:
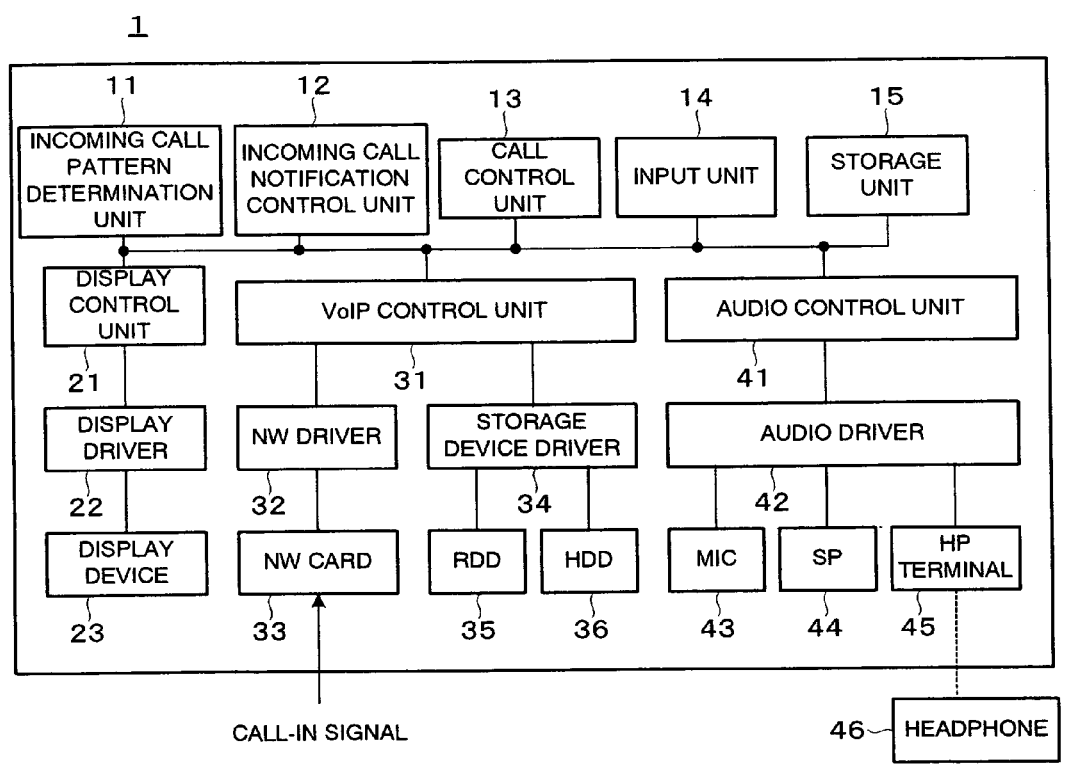
FIG. 1 is a block diagram representing an IP phone terminal according to an embodiment of the present invention.

FIG. 1 is a block diagram representing an IP phone terminal 1 being a receiving device according to an embodiment of the present invention.

This IP phone terminal 1 exchanges packets with a network, and thereby, enables calls with other IP phone terminals. Here, the IP phone terminal 1 is to be configured by using a computer (for example, a notebook computer), but it may also be configured by a dedicated device.

The IP phone terminal 1 has an incoming call pattern determination unit 11, an incoming call notification control unit 12, a call control unit 13, an input unit 14, a storage unit 15, a display control unit 21, a display driver 22, a display device 23, a VoIP control unit 31, a network driver 32, a network card 33, a storage device driver 34, a removable disk drive 35, a hard disk drive 36, an audio control unit 41, an audio driver 42, a microphone 43, a built-in speaker 44, and a headphone terminal 45. Incidentally, these drivers are composed of a hardware or a software.

The incoming call pattern determination unit 11 determines how to perform (or not to perform) the incoming call notification to a user based on a user status stored in the storage unit 15 and a caller of a call-in signal.

The incoming call notification control unit 12 controls the incoming call notification, and for example, changes over a means for the incoming call notification with time going.

The call control unit 13 controls a status during a call, and for example, attempts to reduce noises having a possibility for being an obstacle for the call.

The input unit 14 is an input equipment such as a keyboard or a mouse.

This input unit 14 can be used for the incoming call notification. For example, the incoming call notification can be made by using a function indication lamp, a function button lamp, and an auxiliary display disposed on the keyboard. Besides, the mouse can be used for the incoming call notification.

The function indication lamp is a light-emitting element representing an operation status of a computer. In the function button, a button and a light-emitting element are combined together, and an input status from this button is represented by the light-emitting element. The incoming call indication can be made by a blinking of the light-emitting element, and the change of display colors in these function indication lamp and function button. Besides, if these light-emitting elements are composed of plural light-emitting sources, the incoming call notification can be made by displaying patterns or by changing or blinking the display patterns. Incidentally, in the change of the display patterns, the case when the display colors are changed totally or partially is included.

The auxiliary display is disposed on the keyboard or the like, and it is a display element, for example, a liquid crystal display element to make some auxiliary display. The incoming call notification can be made by a lighting or a blinking of a backlight of the auxiliary display.

In case when the mouse is an optical mouse reading a position optically, the light-emitting element (LED, and so on) is built in, and the incoming call notification can be made by the blinking of the light-emitting element. Besides, if a vibrator is built in the mouse, the incoming call notification can be made by the vibration from the vibrator.

The storage unit 15 stores a user status representing a status of a user, and a caller number list, and functions as a user status storage unit.

The user status is categorized into three statuses, for example, "free", "busy", and "away". "Free" shows the status that the user is in his/her own desk (near the IP phone terminal 1) and able to receive a telephone call (able to answer a call status). "Busy" shows the status that the user is in his/her own desk, but they don't want to answer a call if possible because they are busy (difficult to answer the call status). "Away" shows the status that the user is not in his/her own desk, and unable to receive the call (unable to receive the call status).

This user status can be set by the user's input from the input unit 14. Besides, the user status at that time can be obtained by a scheduler (a software by which the user remembers and confirms a schedule of his/her own). Further, the user status can be set by the presence/absence of the input from the input unit 14. For example, when the user does not operate the keyboard for a predetermined time, the user status can be judged as "away".

The caller number list is a list of a caller number (caller identification indicator) of an intended party of the user, and what is called an address list corresponds to this. In this caller number list, the caller number and the level of importance determined by the user is corresponded. For example, the caller number is categorized into the importance A, B and C.

The display control unit 21 is a control device to control the display device 23 via the display driver 22.

The display driver 22 controls the display device 23 by the instruction from the display control unit 21.

The display device 23 is a display equipment such as a liquid crystal display device (LCD), CRT. Incidentally, the display device 23 can perform the incoming call notification by flashing (blinking) of the screen, releasing of the screen saver, and so on.

The VoIP control unit 31 is a control device to control a VoIP (Voice over IP), namely, an audio packet.

The network driver 32 controls the network card 33 by the instruction from the VoIP control unit 31.

The network card 33 enables the call-in, the calling, and so on, by exchanging the audio packet and the call-in signal (call-in packet) between the network such as Internet, and it corresponds to the call-in signal receiving unit.

The storage device driver 34 controls the removable disk drive 35 and the hard disk drive 36 by the instruction from the VoIP control unit 31. As a result, an answer phone recording by using the removable disk drive 35 and the hard disk drive 36 becomes possible. The contents of the answer phone recording can be replayed by the operation of the user.

The removable disk drive 35 is a device to read/write attachable/detachable disks such as CD (Compact Disk), DVD (Digital Versatile Disk), and MOD (Magneto-Optical Disk).

The hard disk drive 36 is a device to read/write an HD (Hard Disk).

The incoming call notification can be made by these removable disk drive 35 and hard disk drive 36. For example, vibrations are generated by increasing the rotation speed of these disks, or a disk of the removable disk drive 35 is ejected, and thereby the call-in notification can be made.

The audio control unit 41 is a device to control the input/output of the sound of the microphone 43, the built-in speaker 44, and the headphone terminal 45 via the audio driver 42.

The audio driver 42 is a device to input/output audio signals to/from the microphone 43, the built-in speaker 44, and the headphone terminal 45 by the instruction from the audio control unit 41.

The microphone 43 is an audio input device to convert the sound to the audio signal.

The built-in speaker 44 is an audio output device to convert the audio signal to the sound.

The headphone terminal 45 is an output terminal to output the audio signal, to/from which the headphone 46 is attachable/detachable. Incidentally, a headset in which the headphone and the microphone are combined can be used instead of the headphone 46.

The incoming call notification by a sound can be performed by using these built-in speaker 44 and headphone 46. For example, the user's attention can be aroused by sounding an electronic sound or a melody.

Besides, the incoming call notification other than by the sound can be performed by using the built-in speaker 44. That is to say, the incoming call notification by vibrations can be performed by vibrating the built-in speaker 44 with a low frequency or a pulse wave having a smaller frequency than an audible range.

Figure 2A:
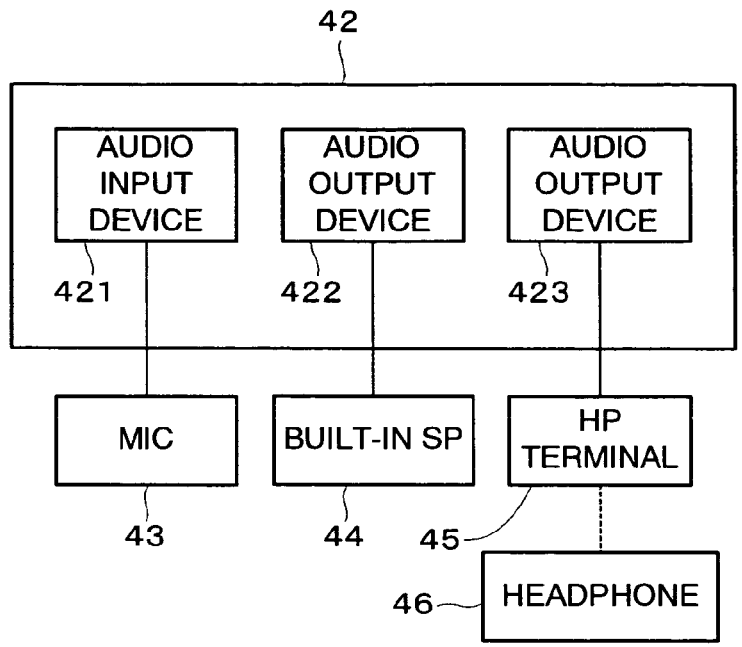
FIG. 2A and FIG. 2B are block diagrams representing examples of internal structures of an audio driver respectively.
Figure 2B:
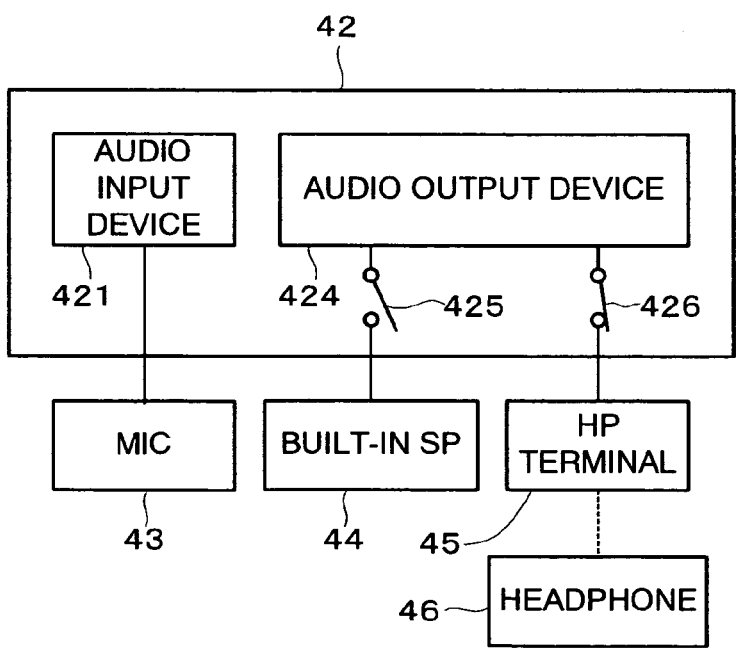

FIG. 2A and FIG. 2B are block diagrams representing examples of internal structures of the audio driver 42 respectively.

In FIG. 2A, the audio driver 42 is sectionalized into an audio input device 421 and audio output devices 422 and 423. Namely, the audio signals to the built-in speaker 44 and the headphone terminal 45 are outputted by the audio output devices 422 and 423 respectively.

In FIG. 2B, the audio driver 42 is sectionalized into the audio input device 421 and an audio output device 424. Namely, the audio signals to the built-in speaker 44 and the headphone terminal 45 are outputted by the audio output device 424, and the output destination is changed over by switches 425 and 426.

(Operation of IP Phone Terminal 1)

Figure 3:
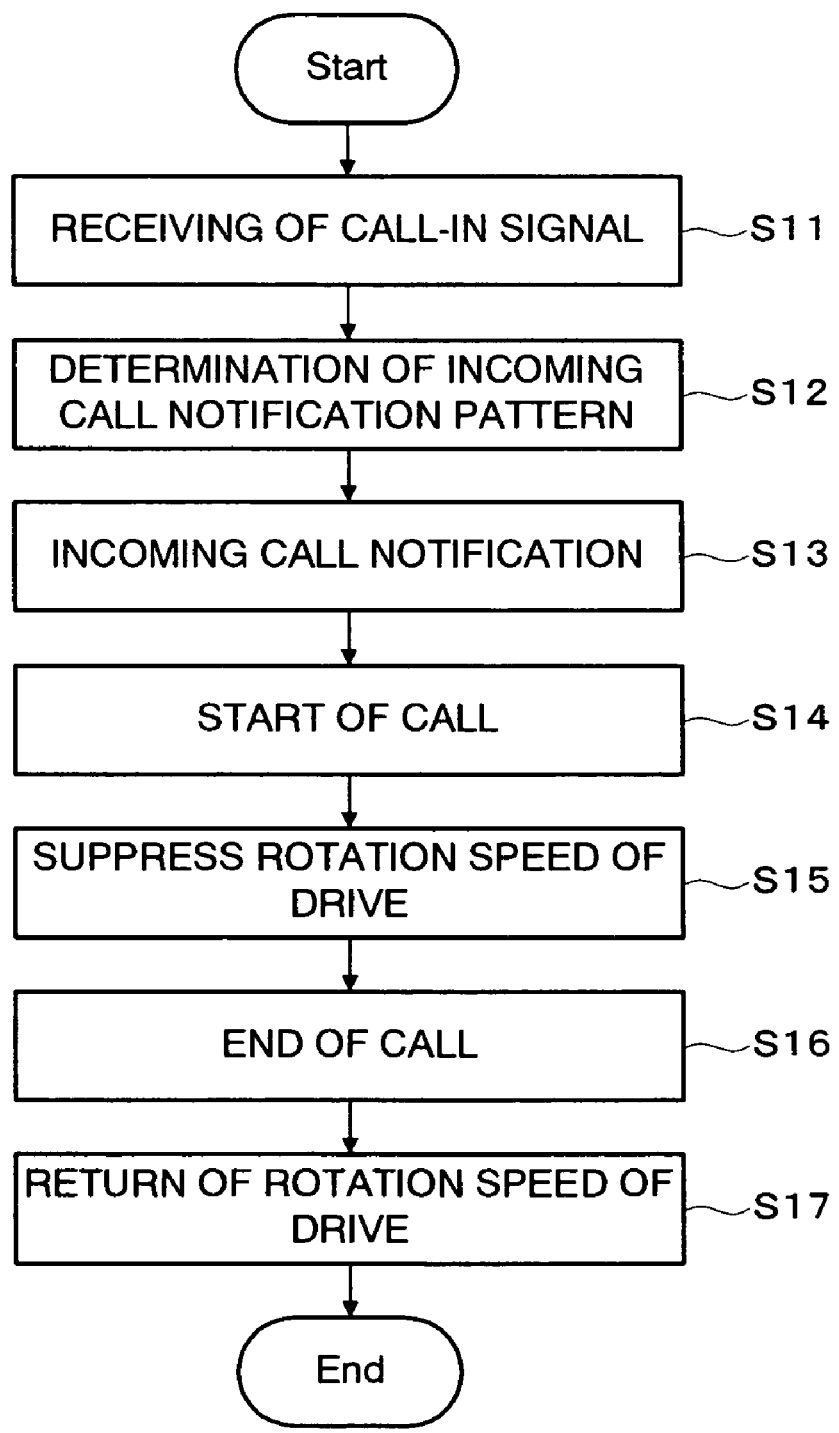
FIG. 3 is a flowchart representing an example of an operation procedure of the IP phone terminal at the time of incoming call and a calling according to the embodiment of the present invention.

FIG. 3 is a flowchart representing an example of an operation procedure of the IP phone terminal 1 at the time of an incoming call and a calling.

A. Receiving of a Call-in Signal (Step S11)

The IP phone terminal 1 receives a call-in signal (call-in packet) from the other IP phone terminal. This call-in signal is received by the network card 33 and reach the network driver 32 and the VoIP control unit 31.

B. Determination of the Incoming Call Notification Pattern (Step S12)

The VoIP control unit 31 issues an instruction for the incoming call pattern determination unit 11 to determine the incoming call pattern, and thereby, the incoming call pattern is determined by the incoming call pattern determination unit 11.

Figure 4:
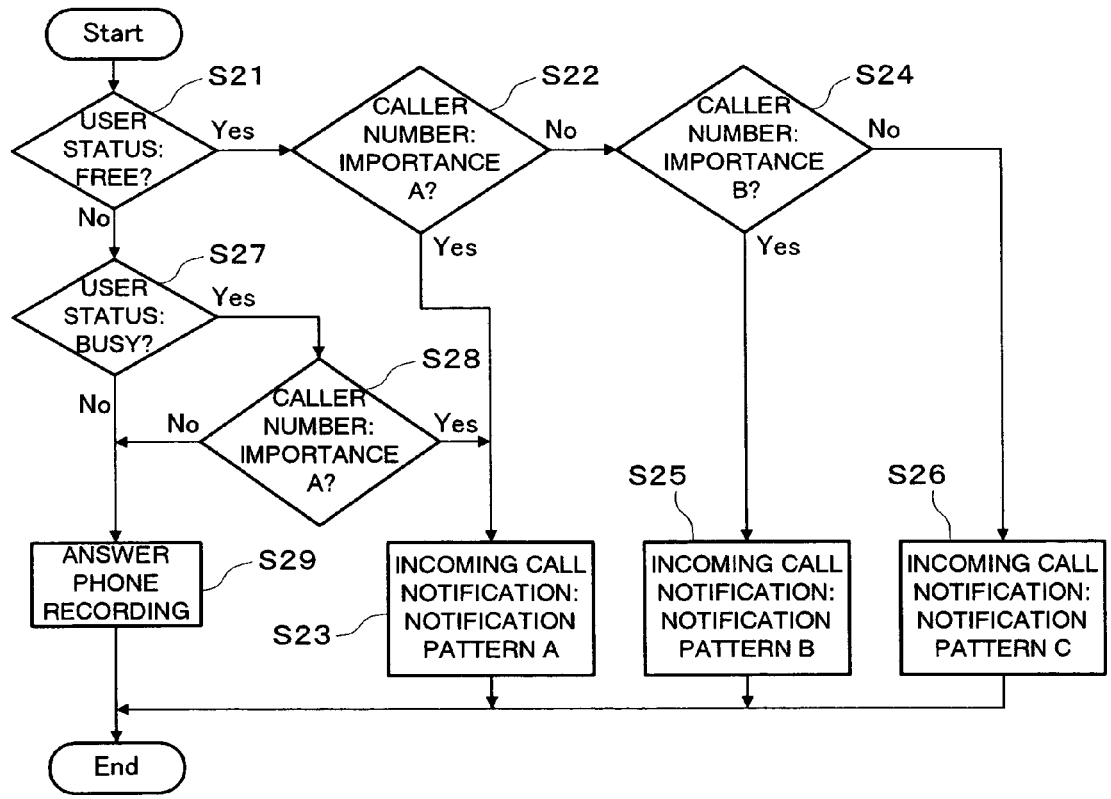
FIG. 4 is a flow chart showing an example of a determination procedure of an incoming call pattern.

FIG. 4 is a flow chart showing an example of a determination procedure of an incoming call pattern. Here, the incoming call notification method is determined by the user status and the caller (caller number). Namely, the incoming call pattern is determined in accordance with the combination of the user status divided into three statuses of "free", "busy", and "away", and the caller (caller number) divided into A, B, and C according to the importance in descending order. As stated above, the user status is stored in the storage unit 15.

The caller number is contained in the incoming call signal, and is extracted from the incoming call signal by the VoIP control unit 31. Further, the correspondence between the caller (caller number) and the importance is stored in the storage unit 15 as the caller number list.

When the user status is "free", the incoming call notification is made by the incoming call notification patterns A, B, and C in accordance with the importance A, B, and C of the caller (step S21 to step S26). As the incoming call notification pattern, various means can be used within the range of which the user can recognize the difference therebetween. As it is described later, the difference of the incoming call notification patterns A, B, and C can be identified by changing the display pattern (for example, shape, color, and so on), and by differing the notification means (for example, image, sound, and vibration).

When the user status is "busy", it is notified by using the incoming call notification pattern A if the importance of the caller is A, and it is transferred to the operation of an answer phone recording if the importance of the caller is the other B or C (step S27 to step S29, and step S23).

When the user status is "away", it is transferred to the operation of the answer phone recording (step S27 and step S29).

The user can recognize the importance of the caller by the incoming call notification patterns A, B, and C. Further, the user can continue his/her work undisturbed by the call because the answer phone recording may be performed when the user status is "busy" and the importance of the caller is other than A.

At the time of operation of the answer phone recording, the message from the caller is recorded on the removable disk drive 35 or the hard disk drive 36. The recorded message is replayed by the user operation.

C. Incoming Call Notification (Step S13)

The incoming call notification to the user is made by the incoming call notification control unit 12.

As is already described, the incoming call notification can be made by using various means in addition to the usual notification by using sound. Besides, the above-described incoming call pattern can be changed in accordance with the caller.

Concrete examples of the incoming call notification are shown in the following (1) to (4).

(1) Incoming call notification by using the display device 23: flushing (blinking) of the screen, releasing of the screen saver.

(2) Incoming call notification by using the input unit 14:
function button lamp, function indication lamp: blinking or change of color of the lamp (change of the incoming call pattern is possible by a blinking pattern, a color change pattern, or a combination of lighted lamps).
auxiliary display: lighting of a backlight (change of the incoming call pattern is possible by the display contents on the auxiliary display).
mouse: blinking of the light-emitting element, and vibrations by the built-in vibrator at the optical mouse.

(3) Drive and relevance (removable disk drive 35, hard disk drive 36): generation of vibrations by spin-up or an eject operation.

(4) Built-in speaker 44: generation of vibrations by regeneration of a low frequency or a pulse wave.

As stated above, it is possible to notify the incoming call by using various means, and also, the incoming call pattern can be changed if necessary. The change of the incoming call pattern can be performed by changing the display contents in the incoming call notification means, but it is permissible if the incoming call notification means itself is changed.

Besides, the incoming call notification means can be changed in time-series if necessary.

FIG. 5 is a flow chart showing an example of a procedure to change over the incoming call notification means in accordance with an elapsed time from a receiving of the incoming call.

The incoming call notification is made by using vision within a first predetermined period of time (for example, three seconds) from a receiving of the incoming call (step S31). For example, the display and blinking at the display device 23, the auxiliary display of the keyboard, and the lamp (function indication lamp, function button lamp).

The incoming call notification is made by using the ring tone from the headphone 46 in addition to those within a second predetermined period of time (for example, six seconds) from the receiving of the incoming call (step S32). The ring tone from the headphone 46 is an internal sound which is hard to be heard from outside other than the user.

Within a third predetermined period of time (for example, nine seconds) from the receiving of the incoming call, the incoming call notification is made by vibrations such as the spin-up of the disk drive (increase of the number of rotations of the disk), regeneration of the low frequency and the pulse wave at the built-in speaker 44, and the vibrator of the mouse (step S33) in addition to the notification means up to that time.

After that, the incoming call notification is made by using the ring tone from the built-in speaker 44 (step S34). The ring tone from the built-in speaker 44 is an external sound which can be heard by a third party other than the user.

Figure 6A:
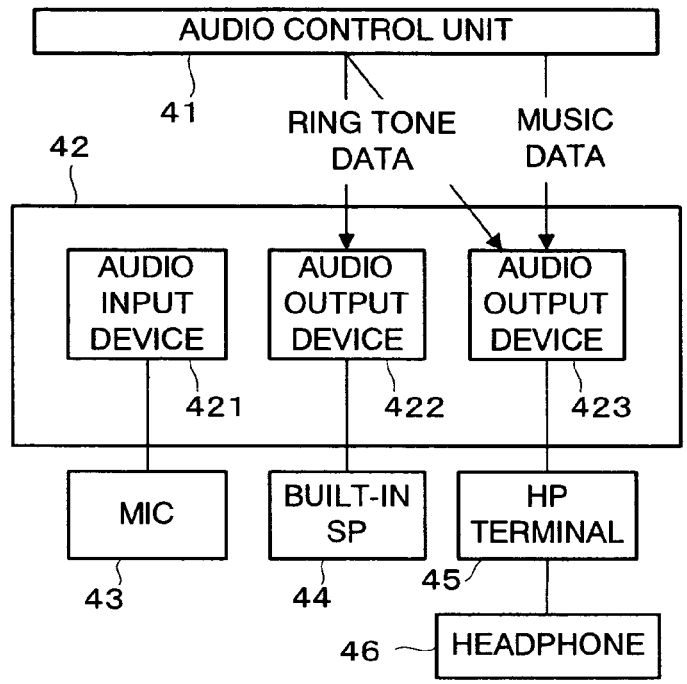
Figure 6B:
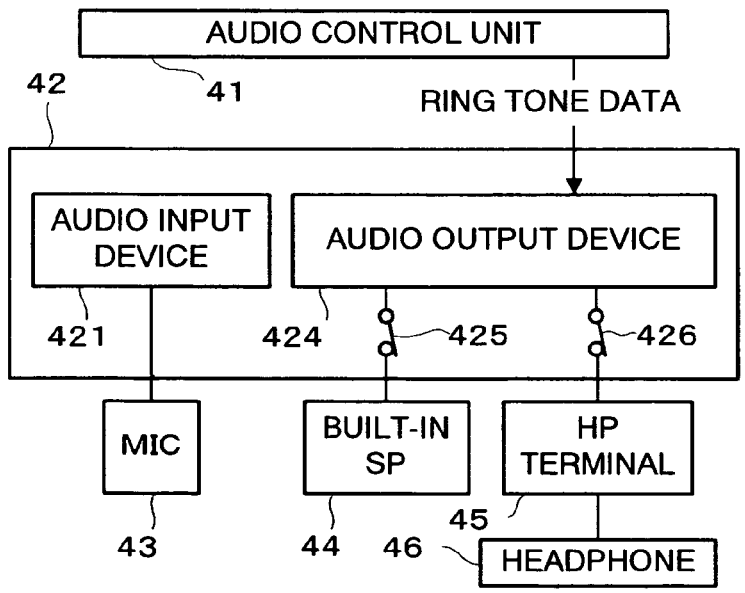

FIG. 6A and FIG. 6B are views representing examples of a signal path of the ring tone at the time of a call-in respectively, and they are corresponding to FIG. 2A and FIG. 2B.

In FIG. 6A, the audio signal to the built-in speaker 44 and the headphone terminal 45 are outputted from both of the audio output devices 422 and 423, respectively. Consequently, the ring tone is sounded from both of the built-in speaker 44 and the headphone 46, and the audio data (music, and so on) for example, other than the ring tone can be sounded only from the headphone 46. That is to say, when the headphone 46 is connected to the headphone terminal 45 and music or the like is replaying, the ring tone is divided into the audio output devices 422 and 423, and the ring tone is replayed both from the built-in speaker 44 and the headphone 46. As for the audio data other than the ring tone, it is sent only to the audio output device 423 and replayed only from the headphone 46.

Incidentally, this control is performed by the audio control unit 41. As the ring tone data which is the base of the ring tone, the data stored in, for example, the hard disk drive 36 as a file can be used.

In FIG. 6B, two signal paths to the built-in speaker 44 and the headphone terminal 45 from the audio output device 424 can be controlled independently, and the ring tone can be replayed from the built-in speaker 44 at the time when the headphone 46 is connected to the headphone terminal 45 (usually, when the headphone 46 is connected to the headphone terminal 45, a replay signal to the built-in speaker 44 is cut off by a physical switch, and the ring tone is not replayed from the built-in speaker 44). That is to say, at the time of call-in, the call-in is notified by turning on the switch 425 at the built-in speaker 44 side regardless that the headphone 46 is connected to the headphone terminal 45 or not.

At the normal time other than the call-in, the following operation is performed depending on the connection status of the headphone 46 to the headphone terminal 45 detected by some means.

When the headphone 46 is not connected to the headphone terminal 45, the switch 425 at the built-in speaker 44 side is turned on. At this time, the switch 426 at the headphone terminal 45 side can be turned off (for example, in case when there is a possibility of lowering the quality of sound and volume by turning on the switches 425 and 426 at the same time). When the headphone 46 is connected to the headphone terminal 45, the switch 425 at the built-in speaker 44 side is turned off.

Besides, in case of generating ring tone (or call-in sound), it is preferred to stop outputting music and the like from the built-in speaker 44 and the headphone terminal 45, or reproducing movies and the like by display device 23. This is because the incoming call notification (for example, the ring tone from the built-in speaker 44 and the headphone terminal 45, or display of the incoming call notification by the display device 23) is recognized more certainly.

D. Starting of a Call (Step S14)

The user inputs something in accordance with the incoming call notification, and thereby, a call between the caller and the user is started.

During this call, the control by the call control unit 13 is performed. At this time, the call control unit 13 attempts to lower the rotation-speed of the drives (removable disk drive 35, hard disk drive 36), and the noise during the call, especially for the noise goes into the microphone 43 is reduced (step S15). That is to say, the suppression of the rotation speed or the stop of the rotation of the removable disk drive 35 and the hard disk drive 36 is performed. When microphone 43 is used for hands-free, generation of howling and so on can be reduced E. Completion of the Call (Step S16)

The call between the caller and the user is completed by some input by the user or the caller. According to this completion of the call, the rotation speed of the drives (removable disk drive 35, hard disk drive 36) comes back to the status before the call, and the improvement of the read/write speed from/to the drives is attempted.

As stated above, the above described embodiment has the following characteristics.

- The importance of the caller and the incoming call pattern is corresponded, and thereby, it is possible to know the importance of the caller before the user answers the call.
- When the user is busy, it is possible to set to notify the incoming call only from the person of high importance, and thereby, the efficiency of the work can be improved.
- The incoming call is notified in stages by the lamp or the blinking of the lamp, the vibrations of the drive and the speaker, in addition to the sound, and thereby, the influence to surrounding people can be minimized.
- When the headphone 46 is connected to the headphone terminal 45, the ring tone is sent from the built-in speaker 44. Consequently, the user can know the incoming call even when the user does not wear the headphone 46. In this case, when the user listens to the music on the headphone 46, the music is not replayed from the built-in speaker 44, and thereby, the influence to surroundings can be reduced.
- During the call, the rotation of the drive type device is suppressed or stopped, and thereby, the noise going into the microphone 43 can be reduced.

OTHER EMBODIMENT

The embodiment of the present invention is not limited to the above-described embodiment, and can be enlarged and changed, and the enlarged and changed embodiments are included in the technical scope of the present invention.

What is claimed is:

1. A receiving apparatus, comprising:
a call-in signal receiving unit to receive a call-in signal;
an audio output unit to output a ring tone based on a ring tone signal;
an audio output terminal to output the ring tone signal;
a ring tone signal generation unit to generate the ring tone signal based on the call-in signal received by said call-in signal receiving unit, the ring tone signal generation unit configured to:
   (a) output the ring tone signal to both the audio output terminal and the audio output unit, when an external audio output device is connected to the audio output terminal, and
   (b) output the ring tone signal to the audio output unit and to not output the ring tone signal to the audio output terminal, when the external audio output device is not connected to the audio output terminal;
an audio signal output unit configured to:
   (a) output an audio signal to the audio output terminal and to not output the audio signal to the audio output unit, when the external audio output device is connected to the audio output terminal, and
   (b) output the audio signal to the audio output unit and not to output the audio signal to the audio output terminal, when the external audio output device is not connected to the audio output terminal.

2. The receiving apparatus according to claim 1, further comprising:
the audio signal output unit to not output the audio signal to both the audio output unit and the audio output terminal, when the ring tone signal is generated by the ring tone signal generation unit.

3. The receiving apparatus according to claim 1, further comprising:
a call-in notification unit to notify the call-in by using images or vibrations based on the call-in signal received by said call-in signal receiving unit.

4. The receiving apparatus according to claim 3, further comprising a disk drive,
wherein the call-in notification unit notifies the call-in by varying a number of rotations of the disk drive.

5. The receiving apparatus according to claim 3, further comprising a removable disk drive,
wherein the call-in notification unit notifies the call-in by ejecting a disk from the removable disk drive.

6. The receiving apparatus according to claim 1, further comprising:
a disk drive; and
a number of rotations control unit to reduce the number of rotations of a disk of said disk drive at the time of a call.

7. A computer readable medium encoded or embodied with a computer program capable of being executed by a computer, comprising:
receiving a call-in signal;
outputting a ring tone based on a ring tone signal;
outputting the ring tone signal;
generating the ring tone signal based on the call-in signal;
outputting the ring tone signal to both an audio output terminal and an audio output unit, when an external audio output device is connected to the audio output terminal;
outputting the ring tone signal to the audio output unit and not outputting the ring tone signal to the audio output terminal, when the external audio output device is not connected to the audio output terminal;
outputting an audio signal to the audio output terminal and not outputting the audio signal to the audio output unit, when the external audio output device is connected to the audio output terminal; and
outputting the audio signal to the audio output unit and not outputting the audio signal to the audio output terminal, when the external audio output device is not connected to the audio output terminal.

* * * * *